ELECTRIC RESISTANCE MATRIXES FOR CODE CONVERSION

Filed April 22, 1968 5 Sheets-Sheet 1

Inventors
Stig Helge Lennart Ljungdell
Karl Birger Uvelius
Karl-Erik Bernston
By Karl W. Flocks
Attorney Dec. 30, 1969 S. H. L. LJUNGDELL ET AL 3,487,268

ELECTRIC RESISTANCE MATRIXES FOR CODE CONVERSION

Filed April 22, 1968 5 Sheets-Sheet 3

United States Patent Office 3,487,268
Patented Dec. 30, 1969

3,487,268
ELECTRIC RESISTANCE MATRIXES FOR CODE CONVERSION
Stig Helge Lennart Ljungdell, Bjarred, and Karl-Birger Uvelius and Karl-Erik Berntson, Malmo, Sweden, assignors to Aktiebolaget Addo, Malmo, Sweden
Filed Apr. 22, 1968, Ser. No. 723,050
Claims priority, application Sweden, Apr. 25, 1967, 5,803/67
Int. Cl. H02b *1/04, 9/00*
U.S. Cl. 317—101 3 Claims

ABSTRACT OF THE DISCLOSURE

An electric resistance matrix for code conversion has two sets of crossing matrix leads on the opposite faces of an insulating plate and connecting means extending through a hole in said plate for connecting two leads from one and the other set crossing each other at the hole, said connecting means comprising a layer of resistance material on one face of said plate and connected with one of the two leads, and metallic means having a portion connected to said layer and a portion connected in an interruptible manner to the other lead.

In processing data in the form of electric signals it is known to effect code conversion with the aid of electric resistance matrices having a set of input leads which are connected according to the desired code with a set of output leads by means of electric resistors. The prior-art resistance matrices are composed of individual resistor components which are soldered according to the desired code conversion to the input and output leads of the matrix. This prior-art construction is relatively expensive in manufacture, and alteration of the code requires the services of experts. As a consequence, resistance matrices are of little attraction in connections where the code often has to be adjusted or determined by personnel scarcely experienced in the manufacture of electric circuits. There may be mentioned by way of example office staff who deals with the establishment of routines for office work and who shall determine or alter the program by which an office machine is to operate or an office machine is to control another office machine.

This invention eliminates this drawback and thus relates to an electric matrix for code conversion. Characteristic of this matrix is that it comprises a plate of electrically insulating material having on one face a first set of non-crossing matrix leads and on the other face a second set of non-crossing matrix leads which in a projection perpendicular to the plane of the plate cross the matrix leads of the first set at a plurality of crossings, said plate having through-holes at or adjacent said crossings and that the two leads associated with each crossing are interconnected or interconnectible in an interruptible manner by means of a connecting member extending through the hole associated with the crossing, said connecting member having a layer of resistance material which is disposed on one face of the plate and connected to the lead provided on said face and associated with the first set of leads, and a metallic member having a portion connected to the layer of resistance material and a portion connected or connectible in an interruptible manner to the lead associated with the second set of leads.

The invention will be more fully described in the following with reference to the accompanying drawings illustrating some embodiments of the resistance matrix.

Figure 1:
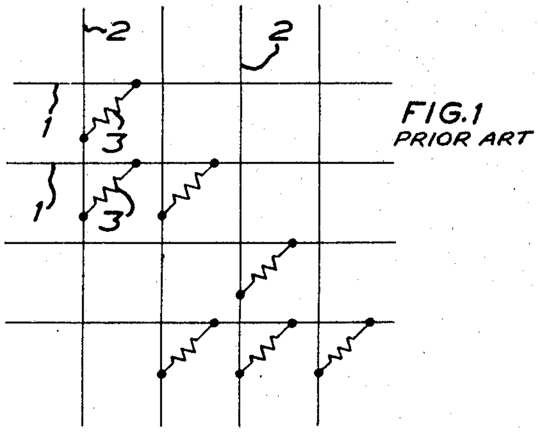
FIG. 1 PRIOR ART
FIGURE 1 is a diagrammatic view of an electric resistance matrix.

FIGURE 1 diagrammatically shows an electric resistance matrix for code conversion. The matrix has a plurality of horizontal input leads 1 and a plurality of vertical output leads 2. Each lead 1 is connected according to the desired code conversion to one or more leads 2 by means of resistors 3. It is assumed by way of example that the matrix shown in FIGURE 1 is utilized for the program control of an office machine which under various program steps shall effect different combinations of operations. The leads 2 are then connected each to its respective control means (not shown). Said control means are adapted to cause the machine to effect a particular operation when the respective control means is energized with current above a given threshold value, while the leads 1 each correspond to its respective program step and are placed under a given voltage one at a time by means of a program stepping mechanism (not shown). When for example the uppermost lead 1 in FIGURE 1 is placed under voltage, only the control means connected to the lead 2 to the far left in FIGURE 1 will cause the machine to effect a certain operation. When voltage is applied to the uppermost but one lead 1 the control means connected to the two leads 2 to the far left will cause the machine to effect the operations associated with these two control means. A control means supplied with current, only by the intermediary of a plurality of resistors 3 in series, from a lead 1 to which voltage is applied will not have a current above the threshold value supplied to it and as a consequence will not cause the machine to effect the operation associated with said control means. All this is prior art and has been mentioned only to make the following description more easily understandable.

A resistance matrix which according to the invention is in the form of a P.C. card is shown in FIGURES 2–6. The matrix has a plate 4 made from electrically insulating material. On the face of the plate 4 shown in FIGURE 2 there has been disposed by some of the known methods for producing printed circuits or P.C. cards a first set of matrix leads 5 which run in parallel in a vertical sense with regard to FIGURE 2; only a few such leads are drawn by full lines for greater simplicity. On the face of the plate 4 shown in FIGURE 3 there is provided in a corresponding manner a second set of matrix leads 6 which run in parallel in a horizontal sense with respect to FIGURE 3; only a few leads are drawn by full lines for greater simplicity. At the lower edge of the plate 4 in FIGURES 2 and 3 contact elements 7 are provided on both sides of the plate for cooperation with contact springs in a holder (not shown) for the matrix in the customary manner. Every second matrix lead 5 is connected by connecting lines 8 to some of the contact elements 7 on the face of the plate 4 shown in FIGURE 2, and the remaining matrix leads 5 are connected by connecting lines 9 extending through all-plated holes 10 in the plate 4 to some of the contact elements 7 on the face of the plate 4 shown in FIGURE 3. In a corresponding manner the matrix leads 6 are connected by connecting lines 11 and 12 each with its respective contact element 7 on one and the other face of the plate 4 as will appear from FIGURES 2 and 3. Of course, the contact elements and the connecting lines 8, 9, 11, 12 are realized in some customary way for the production of P.C. cards or printed circuits.

Figure 2:
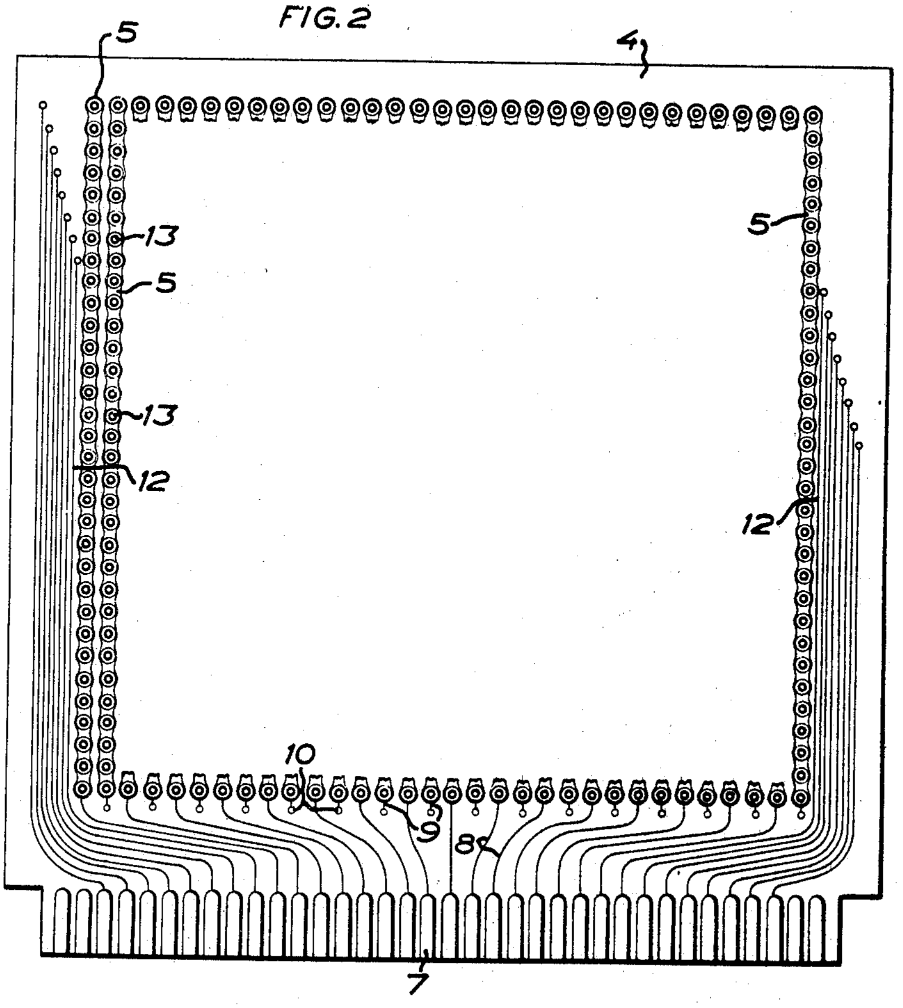
FIGURES 2 and 3 are views of one embodiment of a resistance matrix according to the invention, as seen from one and the other face, respectively.
Figure 3:
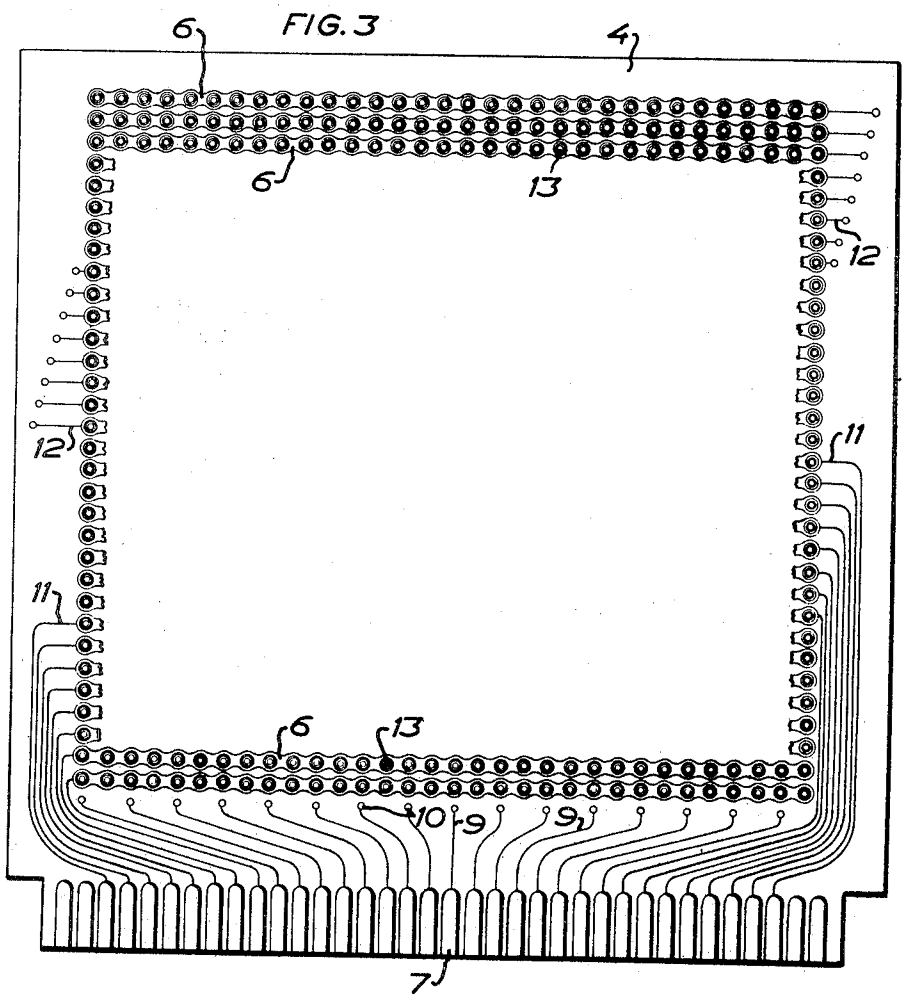
Figure 4:
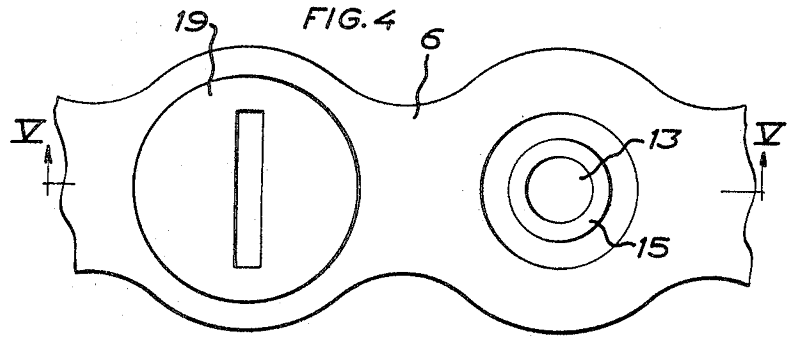
FIGURE 4 is a view on a larger scale of part of FIGURE 3.

In the embodiment illustrated in FIGURES 2 and 3 each matrix lead 5 crosses all matrix leads 6 as viewed in a projection at right angles to the plane of the plate 4, and at each crossing between the leads 5 and 6 there is provided a through-hole 13 in the plate 4. As is best seen from FIGURES 4–6 the axes of the holes 13 intersect the axes of the matrix leads 5 and 6, and said leads 5 and 6 annularly surround and are spaced about the holes 13. A metal sleeve 14 extends through each hole 13 and at the ends has flanges 15, 16 which engage one and the other side face of the plate 4 while leaving a space between the respective flange and the respective matrix lead 5, 6. The sleeve means 14–16 can suitably be provided in some customary way for the production of printed circuits or P.C. cards. The space between each flange 16 and the matrix lead 5 annularly surrounding said flange is bridged by a layer 17 of resistance material, said layer adhering to the plate 4 in the annular space between the flange 16 and the lead 5 and preferably also extending slightly inwardly over the marginal portion of the flange 16 and the marginal portion of the lead 5 bordering upon the annular space, as shown in the drawing. The layer 17 of resistance material is suitably applied by some of the methods employed for the production of printed circuits or P.C. cards, for instance by screen printing, spraying through stencils, precipitation, etc.

Figure 5:
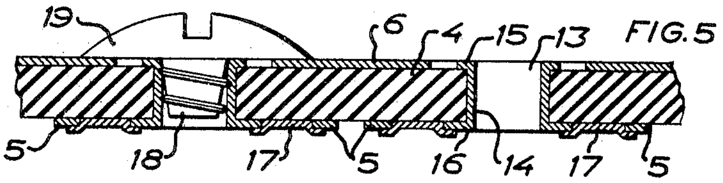
FIGURE 5 is a section on line V—V in FIGURE 4.
Figure 6:
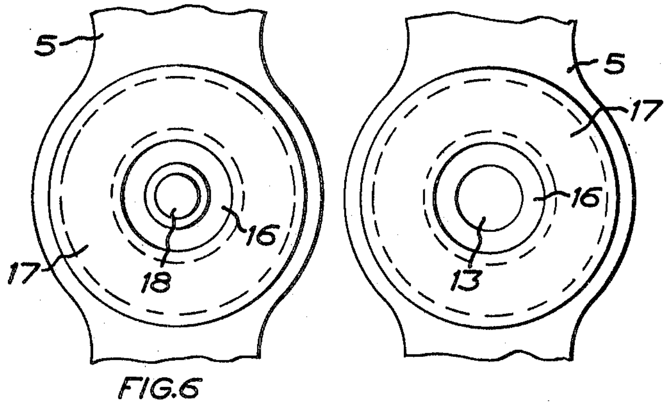
FIGURE 6 is a bottom plan view of the device in FIGURE 5, i.e. part of FIGURE 2 on a larger scale.

In the initial state the matrix leads 5, 6 are electrically insulated from each other, but connection between a desired matrix lead 5 and a desired matrix lead 6 can readily be established at the crossing of the two leads with the aid of a metal screw which is screwed by means of its shank or stem 18 preferably having self-cutting threads into the sleeve 14 at the crossing of the two leads until the head 19 of the screw is pressed against the lead 16 around the flange 15 and preferably also against said flange, as is shown to the left in FIGURE 5. After mounting of the screw the two leads 5, 6 are interconnected at their crossing by means of a connecting member having a layer 17 of resistance material applied to one face of the plate, and a metallic member formed by the sleeve 14–16 and the screw 18, 19. The two matrix leads are thus interconnected via the resistance layer 17 which serves as a resistor equivalent to the resistor 3 in FIGURE 1. The provision of screws 18, 19 at desired crossings between the matrix leads 5, 6 for building a resistance matrix for the desired code conversion can readily be performed for instance by office staff in accordance with the directions how screws should be placed for obtaining the desired code conversion. Screws 18, 19 which have happened to be incorrectly mounted or which must be moved when passing over from one type of code conversion to another, are also readily removed or rearranged.

Figure 10:
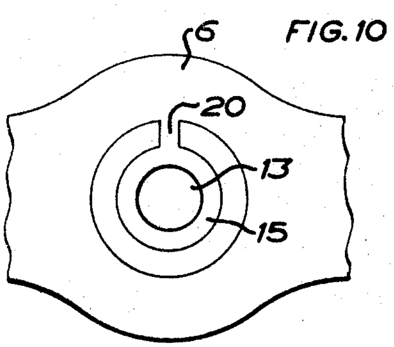
FIGURE 10 is a view corresponding to FIGURE 4 but showing another embodiment.

In lieu of screws 18, 19 it is of course possible to use other types of preferably removable metallic members for bridging the gap between the flange 15 and the lead 6 at a hole 13. Use can be made of for instance a preferably resilient pin retainable under friction in the sleeve 14 and having a head engageable with the lead 6, or a rivet preferably a tubular rivet which is secured in the sleeve 14 and one flange of which is brought to bear against the lead 6. The arrangement can also be realized in such a way that an electrically conductive connection is provided already from the beginning at all crossings between the matrix leads, and whenever necessary the said connection permits breaking in order to realize the desired code conversion. In a matrix assembly otherwise embodied in the manner shown in FIGURES 1–6, such initial connection between the matrix leads can be provided in the manner appearing from FIGURE 10. In this instance the sleeve flange 15 is connected from the very beginning at each hole 13 to the lead 6 with the aid of a narrow lead bridge 20 extending over the annular space between the flange 15 and the lead 6 and being integral, and realized simultaneously, with the lead 6 and the flange 15. When the lead 6 at the crossing in question shall not be connected with the matrix lead on the opposite face of the plate at the hole 13 the lead bridge 20 is readily removed with the aid of some suitable tool, e.g. a knife. Should it prove that one has happened to remove a bridge 20 that should remain in position, connection can be readily re-established for example by means of a screw 18, 19 according to FIGURE 5.

Figure 7:
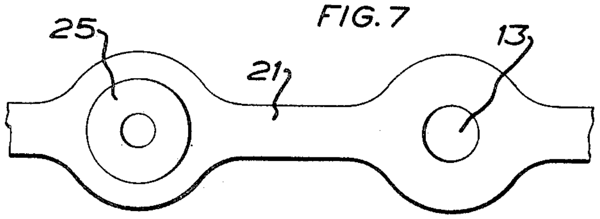
FIGURES 7–9 are views similar to FIGURES 4–6 of a modified embodiment of the invention.
Figure 8:
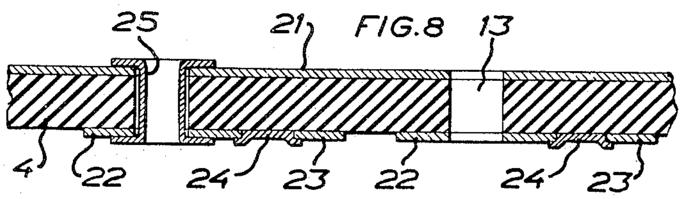
Figure 9:
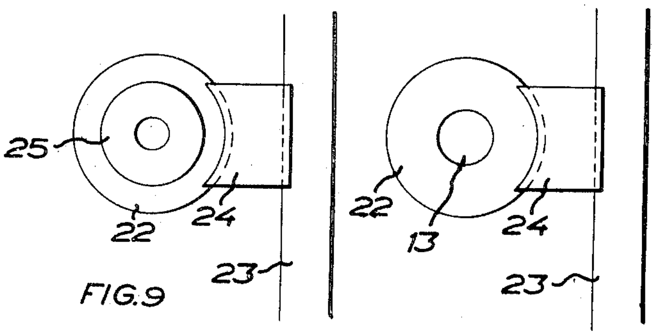

The axes of the holes 13 need not necessarily cross those of the matrix leads 5, 6 and the resistance layers 17 need not form rings around the holes 13, since many other designs are possible. A modification is illustrated in FIGURES 7–9. Here the plate 4 has holes 13 the axes of which cross the matrix leads 21 arranged on one side face of the plate and surrounding the holes 13 annularly, extending up to the edges of the holes. The holes 13 have no metal sleeve 14–16 like in the embodiment shown in FIGURES 4–6. On the other side of the plate each hole is surrounded by a metal ring 22 and laterally of the metal ring there extends a matrix lead 23 at right angles to the aforementioned matrix leads 21. Applied to the plate 4 between each ring 22 and the adjacent matrix lead 23 is a layer 24 of resistance material and this layer preferably extends upwards beyond the marginal portions of the ring 22 and the lead 23, as will appear from FIGURES 8 and 9. An electric connection between a matrix lead 21 and a matrix lead 23 with the resistance layer 24 connected in series can be established for example by securing a tubular rivet 25 in the hole 13 with the flanges of the rivet engaging the lead 21 and the metal ring 22, respectively, as shown to the left in FIGURES 7–9.

What we claim and desire to secure by Letters Patent is:

1. An electric resistance matrix for code conversion, comprising a plate of electric insulating material, a first set of non-crossing matrix leads on one face of said plate, a second set of non-crossing matrix leads on the other face of said plate, said second set of matrix leads, as seen in a projection perpendicular to the plane of said plate, crossing the leads of said first set at a plurality of crossing positions, means defining through-holes in said plate each related to one of the crossing positions of said first and second sets of leads, and connecting means extending through at least one of said holes and connecting in an interruptible manner the two leads of said first and second sets associated with the crossing position related to the hole, said connecting means comprising a layer of resistance material provided on one face of said plate and connected to the lead of said first set, and metallic means having one part connected in an interruptible manner to the lead of said second set and another part connected to said layer of resistance material and comprising a metal sleeve extending through the hole in said plate and a flange on said sleeve engaging said layer of resistance material.

2. A matrix according to claim 1, in which the lead belonging to said first set and connected to said layer of resistance material comprises a section annularly surrounding the hole and said flange, leaving a space therebetween, and said layer of resistance material is disposed on said plate within said space.

3. A matrix according to claim 1, in which the lead belonging to said second set and connected in an interruptible manner to said metallic means comprises a section annularly surrounding the hole and said metal sleeve, leaving a space therebetween, and the part of said metallic means connected in an interruptible manner to the lead of said second set comprises a pin detachably inserted in said sleeve and a head of said pin engaging said section of the lead of said second set.

References Cited

UNITED STATES PATENTS 2,870,400 1/1959 Hickok.
3,372,309 3/1968 Stockdale ------ 174—68.5 XR ELLIOT A. GOLDBERG, Primary Examiner U.S. Cl. X.R.

174—68.5; 338—308, 310